United States Patent
Osaheni et al.

(10) Patent No.: US 6,239,202 B1
(45) Date of Patent: May 29, 2001

(54) ADDITIVE AND METHOD FOR ENHANCING THE HEAT AGE PROPERTIES OF ELASTOMERS

(75) Inventors: John Aibangbee Osaheni, Clifton Park; James Edward Doin, Hoosick Falls; Edwin Robert Evans, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/301,927

(22) Filed: Apr. 29, 1999

(51) Int. Cl.[7] .................................................. C08K 5/101
(52) U.S. Cl. ........................ 524/280; 524/282; 524/588
(58) Field of Search ................................ 524/280, 282, 524/588

(56) References Cited

U.S. PATENT DOCUMENTS

| | | | |
|---|---|---|---|
| 4,486,567 | * 12/1984 | Bowman et al. | 524/863 |
| 5,346,940 | 9/1994 | Brassard et al. . | |
| 5,569,688 | * 10/1996 | Meguriya et al. | 524/188 |
| 5,623,028 | 4/1997 | Fitzgerald et al. . | |
| 5,977,220 | * 11/1999 | Burkus, II et al. | 524/99 |
| 5,998,516 | * 12/1999 | Burkus, II et al. | 524/86 |

* cited by examiner

*Primary Examiner*—Margaret G. Moore
(74) *Attorney, Agent, or Firm*—Noreen C. Johnson; Douglas E. Stoner

(57) ABSTRACT

A curable silicone pre-elastomer composition is disclosed comprising ammonium carboxylate, which upon cure yields a silicone elastomer having improved heat age properties and suitability for high or low temperature sealing applications.

20 Claims, No Drawings

ADDITIVE AND METHOD FOR ENHANCING THE HEAT AGE PROPERTIES OF ELASTOMERS

BACKGROUND OF THE INVENTION

The present invention relates to elastomers. In particular, the present invention relates to an additive for improving the heat age properties of elastomers, including hardness, tensile strength, elongation, and modulus.

Elastomer compositions are known in the art. For example, heat-cured elastomers, particularly silicone elastomers, are very useful in high temperature sealing applications such as electrical wires and cables, automotive and oven gaskets, hot air ducts, window hoods, and the like. In these applications the heat age properties of the elastomer are of primary importance for optimal function. As used herein, "heat age properties" refers to the degree to which high or low temperature affects the elastomer's physical properties, including compression set, elongation, hardness, modulus, and tensile strength. For many applications significant changes in these properties with temperature or in response to temperature could result in failure of the material to meet the requisite performance specifications.

Heat age properties of silicone elastomers are generally dependent on at least three factors: the composition and quantity of the filler; the composition and quantity of any processing aids present in the formulation (processing aids affect the heat age properties of the elastomer by modulating the polymer-filler interactions), and the crosslink density or the state of cure of the polymer phase.

Heat age properties are particularly important in gasket and other sealing applications. Prior art attempts to improve silicon-based gasket materials have focused on improving compression set or sealing force retention. For example, U.S. Pat. No. 5,346,940 to Brassard et al. and U.S. Pat. No. 5,623,028 to Fitzgerald et al. disclose a method for controlling the sealing force retention. There are other examples in the literature describing heat age additives for silicone elastomers, e.g., $TiO_2$, iron octoate, $Ce(OH)_4$ and rare earth octoates. Nonetheless, there remains a need in the art for methods for further improving the heat age properties of elastomers.

SUMMARY OF THE INVENTION

In one of its aspects the present invention is a pre-elastomer composition for the manufacture of an elastomer having improved heat age properties, comprising: (a) a curable polyorganosiloxane composition; (b) a catalyst in an amount effective for promoting cure of the pre-elastomer composition; (c) a filler composition; and (d) ammonium carboxylate. Typically, ammonium carboxylate is present in an amount in the range from about 5 ppm to about 1 weight percent of total polymer composition. In another of its aspects the invention is an elastomer prepared from said pre-elastomer composition. In yet another of its aspects the invention is a method for enhancing the heat age properties of an elastomer which comprises combining a pre-elastomer composition with ammonium carboxylate.

DETAILED DESCRIPTION OF THE INVENTION

The present composition is a curable pre-elastomer composition comprising an ammonium carboxylate, and the elastomer formed therefrom. Use of ammonium carboxylate in curable pre-elastomer compositions results in significant improvement in the heat age properties of the elastomer, which is suitable for both high- and low-temperature sealing applications.

Siloxane-based pre-elastomer compositions for forming elastomers are well known in the art, generally comprising at least one polyorganosiloxane with either vinyl-on-chain moieties or vinyl end-group moieties, or both. Vinyl-on-chain moieties refer to those vinyl groups present on polyorganosiloxanes at a monomer position other than an end-group. In especially preferred embodiments vinyl-on-chain moieties are vinylmethylsiloxy groups, and vinyl end-group moieties are dimethylvinylsiloxy groups. The term end-group moieties within the context of the present invention is synonymous with the term end-stopped moieties.

Preferred siloxane pre-elastomer compositions comprise at least one member selected from the group consisting of:

(a) at least one vinyl end-stopped and vinyl-on-chain substituted polyorganosiloxane having the following formula:

$$M^{vi}D_x^{vi}D_yM^{vi}$$

wherein x and y are independent integers greater than zero and the sum of x and y has values whereby the viscosity of (a) is between 200,000 and 200,000,000 centipoises (cps), and the alkenyl level varies from about 0.005 weight percent to about 14 weight percent based on (a);

(b) at least one vinyl end-stopped polyorganosiloxane gum having the following formula:

$$M^{vi}D_zM^{vi}$$

wherein z is an integer greater than zero having a value whereby the viscosity of (b) is between 10,000 and 150,000,000 cps, and the alkenyl level varies from about 8 to about 2000 parts per million based on (b); and (c) at least one vinyl-on-chain polyorganosiloxane gum having non-reactive end groups with the following formula $$MD^{vi}_qM$$

wherein q is an integer greater than zero whereby the viscosity of (c) is between 200,000 and 200,000,000 cps, and the alkenyl level varies from about 0.01 weight per cent to about 14 weight percent based on (c).

Pre-elastomer compositions of the present invention may also include as an optional component:

(d) a diluent polyorganosiloxane gum having the following formula:

$$MD_wM$$

wherein w is an integer greater than zero whereby the viscosity of (d) is between 200,000 and 200,000,000 cps.

All of the polyorganosiloxane gum components utilized in the present invention have a viscosity ranging from about 10,000 to about 200,000,000 centipoises at 25° C. The amounts of the above components (a)–(c) (optionally in combination with (d)) may be widely varied to produce the pre-elastomer composition, and any particular gum (a), (b), (c), (d) may be completely absent from the polymer system. Any of components (a), (b), and (c), when they are present, typically comprise from about 1 to about 140 parts, preferably from about 1 to about 120 parts, and more preferably from about 2 to about 80 parts by weight of the composition. In especially preferred embodiments the combination of (a)'s, (b)'s, and (c)'s, taken together comprise from about 40 to about 240 parts, preferably from about 60 to about 160 parts, and more preferably from about 80 to about 120 parts by weight of the composition. Component (d) is typically used in an amount from 0 to about 80 parts by weight of the composition. Preferably, the total alkenyl level of the gum blend is in the range from 0.01 to about 0.5 weight percent of the composition.

In the foregoing formulae, $$M \text{ is } R^1_3SiO_{0.5}$$

wherein $R^1$ is selected from the group consisting of alkyl groups having from 1 to 8 carbons, phenyl, and trifluoropropyl;

$$M^{vi} \text{ is } R^2(R^1)_2SiO_{0.5}$$

wherein $R^1$ is selected from the group consisting of alkyl groups having from 1 to 8 carbons, phenyl, and trifluoropropyl, and $R^2$ is selected from the group consisting of linear or cyclic alkenyl groups having from 2 to 10 carbons;

$$D^{vi} \text{ is } R^2R^1SiO$$

wherein $R^1$ and $R^2$ are as previously defined; and $$D \text{ is } (R^3)_2SiO$$

wherein each $R^3$ is independently selected from the group consisting of alkyl groups having from 1 to 8 carbons, phenyl, and trifluoropropyl. Polyorganosiloxanes containing mixtures of D groups, such as, but not limited to, a combination of (dialkyl-SiO) and (alkyl-trifluoropropyl-SiO), are also within the scope of the invention.

In addition to the above components, the pre-elastomer compositions may comprise at least one optional process aid, generally a lower molecular weight polyorganosiloxane of the general formula $$M^kD_pM^k \tag{e}$$

wherein p is an integer greater than zero whereby the viscosity of (e) is between about 4 and about 300 cps, wherein (e) is used in an amount of from 0 to about 30 parts, and preferably from about 0.1 to about 10 parts by weight of the composition. In the above formula, D is as defined above, and $$M^k \text{ is } R^4(R^1)_2SiO_{0.5}$$

wherein $R^1$ is as defined above, and $R^4$ is selected from the group consisting hydrogen, hydroxyl, or alkoxy radicals such as methoxy or ethoxy.

More than one polyorganosiloxane of the formula $M^kD_pM^k$ may be present in the pre-elastomer composition. A preferred composition comprises a combination of a polyorganosiloxane of the formula $M^kD_pM^k$ wherein $M^k$ comprises a hydroxyl group, and a polyorganosiloxane of the formula $M^kD_pM^k$ wherein $M^k$ comprises a methoxy group.

A preferred composition comprises a vinyl end-stopped, vinyl-on-chain polydimethylsiloxane gum in an amount of about 100 parts, and, as measured per 100 parts by weight of the gum, a silanol-stopped low molecular weight polydimethylsiloxane in an amount from about 1.0 to about 4.0 parts, a methoxy stopped polydimethylsiloxane in an amount from about 1.0 to about 4.0 parts, and vinyltriethoxysilane in an amount from about 0.2 to about 1.4 parts. More preferably, the pre-elastomer composition comprises a vinyl end-stopped, vinyl-on-chain polydimethylsiloxane gum in an amount of about 100 parts by weight, and, as measured per 100 parts by weight of the gum, a silanol-stopped low molecular weight polydimethyl-siloxane in an amount from about 2.0 to about 3.0 parts by weight, a methoxy stopped polydimethylsiloxane in an amount from about 2.0 to about 3.0 parts by weight, and vinyltriethoxysilane in an amount from about 0.6 to about 1.0 parts by weight.

Another preferred composition comprises a vinyl end-stopped, vinyl-on-chain poly(trifluoropropylmethylsiloxane-co-dimethylsiloxane) gum in an amount of about 100 parts, a telomeric vinyl end-stopped, vinyl-on-chain trifluoropropylmethyl polyorganosiloxane copolymer in an amount of about 1 to about 10 parts, a vinyl end-stopped, poly(trifluoropropylmethylsiloxane-co-dimethylsiloxane) gum in an amount of about 1 to about 5 parts, and a silanol-stopped trifluoropropylmethyl polyorganosiloxane fluid in an amount from about 2 to about 16 parts. More preferably, the pre-elastomer composition comprises a vinyl end-stopped, vinyl-on-chain poly(trifluoropropylmethylsiloxane-co-dimethylsiloxane) gum in an amount of about 100 parts, a telomeric vinyl end-stopped, vinyl-on-chain trifluoropropylmethyl polyorganosiloxane copolymer in an amount of about 2 to about 5 parts, a vinyl end-stopped, poly(trifluoropropylmethylsiloxane-co-dimethylsiloxane) gum in an amount of about 2 to about 4 parts, and a silanol-stopped trifluoropropylmethyl polyorganosiloxane fluid in an amount from about 5 to about 10 parts.

A reinforcing component (filler) is also added to the formulation. These are generally inorganic materials in particulate form, such as silica ($SiO_2$), quartz flour, diatomaceous earth, barium silicate, barium sulfate, precipitated silica, finely divided quartz, mica, alumina, titania ($TiO_2$), and the like. In particular, the filler suitable for the present formulation is fumed silica which has been rendered hydrophobic according to the methods described in U.S. Pat. No. 5,652,017 to Osaheni et al., which is incorporated herein by reference, wherein some of the surface hydroxyls of the silica, $O_2Si(OH)_2$ (geminal silanol) or $O_3SiOH$ (isolated and adjacent silanols) are treated with 1 to 20% by weight of a hydrophobicizing agent such as octamethyl-cyclotetrasiloxane ($D_4$) or hexamethyidisilazane. The BET surface areas of these fillers are at least 50 square meters per gram ($m^2/g$). The filler composition is generally present in an amount from about 15 to about 80 parts by weight per hundred parts of the polymer composition, and preferably about 20 to about 75 parts by weight. Preferably, the fillers have BET surface areas of at least 200 $m^2/g$.

Curable siloxane-based pre-elastomer compositions for use with the present invention include those curable by free radical initiators, by hydrosilylation, and by high-energy radiation (gamma ray or electron beam) initiation.

Free radical curing of silicone elastomers is effected by heating the elastomer precursor in the presence of a free radical initiator. The predominant curing mechanism involves hydrogen abstraction from the alkyl groups (for example, methyl groups) of an alkylsiloxane moiety followed by radical coupling with another alkyl group creating a cross-linking alkylene bridge. If a small percentage of vinyl groups are present, the alkyl radical can add to the vinylic double bond.

Preferred heat-initiated free radical generating species include alkyl and aroyl peroxides and hydroperoxides, for example diacetyl peroxide, di-tert-butyl peroxide, cumyl hydroperoxide, benzoyl peroxide, bis(2,4-dichlorbenzoyl) peroxide, bis(4-methylbenzoyl)-peroxide, tert-butyl peroxybenzoate, dicumyl peroxide, 2,5-dimethyl-di-(tert-butylperoxy)hexane, and 1,1-di-(tert-butylperoxy)trimethyl-cyclohexane. Both 2,5-dimethyl-di-(tert-butylperoxy) hexane, and 1,1-di-(tert-butylperoxy)trimethylcyclohexane are particularly useful as free radical cure initiators for vinyl silicone heat-cured rubbers.

Curing agents may be conveniently added to pre-elastomer compositions by any means known in the art. In a preferred embodiment one or more curing agents, such as free radical initiators, are added to the pre-elastomer composition in a secondary milling operation following compounding of other components comprising resinous components, filler, and ammonium carboxylate. Curing agents, such as free radical initiators, are generally present in an amount in the range from about 0.01 to about 1.5 parts by weight per hundred parts by weight of the polymer composition.

Hydrosilylation cure occurs between high molecular weight polyorganosiloxanes, e.g., gums, having a vinyl functionality and a low molecular weight crosslinker having silicon hydride functionality. Thus, where hydrosilylation cure is used, the formulation of the curable polymer composition is adjusted to include hydrogensiloxane or hydride fluids to participate in cure and crosslinking. Suitable catalysts include noble metal catalysts and complexes thereof, for example chloroplatinic acid. In addition, an inhibitor is often added to prevent cure initiation prior to heating.

High energy radiation, for example as gamma rays or as an electron beam, can also effect curing. This type of cure causes a wide variety of bonds to be broken. Thus, cross-links occur between a variety of different atomic centers as the radicals created by the high energy recombine to form new chemical bonds.

Other, optional components usable in the pre-elastomer composition include, but are not limited to, performance additives such as zinc oxide, magnesium oxide, copper oxide, ferrous oxide, ferric oxide, aluminum oxide, titanium dioxide, ceric oxide, and the various metal salts of long chain fatty acids such as the metal octoates; and cross-linking agents such as vinyl triethoxysilane, tetramethyldivinyl silazane and the like.

Ammonium carboxylates suitable for use in the present invention include, but are not limited to, the ammonium salts of alkyl and aryl organic acids, for example acetate, propionate, isopropionate, butanoate, butenoate, and other longer chain carboxylates; and benzoates and substituted benzoates, and the like. The ammonium carboxylates are generally used in quantities in the range from about 5 parts per million (ppm) to about 1 weight percent, and preferably in the range from about 100 ppm to about 1000 ppm based on the pre-elastomer composition.

The ammonium carboxylate may be added to the composition by standard methods, including addition of solid ammonium carboxylate, addition of a concentrate of ammonium carboxylate in at least one of the silicone components, addition of a solution or slurry of ammonium carboxylate, in situ generation of ammonium carboxylate, and like methods.

In one embodiment ammonium formate may be provided by batch treatment of the filler with hexamethyldisilazane and formic acid, leaving residual ammonium formate on the filler. Preferably, the ammonium carboxylate is added to the composition as an aqueous solution, preferably before the addition of filler.

The invention is further illustrated by the following non-limiting examples.

EXAMPLE 1

A general procedure for preparation of a curable silicone pre-elastomer composition in accordance with the present invention is as follows. The polymers (a)–(d), process aid(s) (e), vinyltriethoxysilane (hereinafter referred to as VTES), fillers, and aqueous ammonium carboxylate (where indicated) were mixed to a well-massed, homogenous compound and extruded through a 150 mesh screen. Catalyst (2,5-dimethyl-di-(tert-butylperoxy)hexane, available from Elf Atochem under the trade name LUPERSOL 101, at about 0.4 parts per 100 parts polymer composition) was mill mixed into the compound and the material was press-cured at 177° C. (350° F.) for fifteen minutes, and then post-baked at 200 ° C. for 1 hour. Samples for physical property testing were prepared similarly to the process outlined in ASTM #D-3182. Baseline physical properties and physical properties after accelerated heat aging were determined similarly to ASTM #D412.

Elastomers were prepared according to the following Table 1 (parts by weight per 100 parts polymer composition except where noted) using the components identified in Table 2.

TABLE 1

Formulation of Pre-elastomer

| Component | Sample No. | | | | | | | |
|---|---|---|---|---|---|---|---|---|
| | 1* | 2 | 3 | 4 | 5 | 6* | 7 | 8 |
| $a^1$ | 100 | 100 | 100 | 100 | 100 | — | — | — |
| $a^2$ | — | — | — | — | — | 100 | 100 | 100 |
| $e^1$ | 2.4 | 2.4 | 2.4 | 2.4 | 2.4 | 1.0 | 1.0 | 1.0 |
| $e^2$ | 2.4 | 2.4 | 2.4 | 2.4 | 2.4 | 1.0 | 1.0 | 1.0 |
| VTES | 1 | 1 | 1 | 1 | 1 | — | — | — |
| Filler** | 64 | 64 | 64 | 64*** | 64*** | 29 | 29 | 29 |
| Ammonium formate (ppm) | — | 200 | 50 | (~500) | (~630) | — | (~500) | (~630) |

*Comparative samples
**Filler (fumed silica; 200 m²/gram) treated with tetramethylcyclotetrasiloxane, unless noted
***Filler treated with hexamethyldisilazane and formic acid to same level as standard filler, leaving about 500 ppm residual ammonium formate in the filler in Sample 4 and 7, and about 630 ppm in Sample 5 and Sample 8.

TABLE 2

Components for Elastomers of Example 1.

| Component | Description |
|---|---|
| $a^1$ | vinyl end-stopped, vinyl-on-chain polydimethylsiloxane gum (nominal penetration = 600–1200; 570–970 ppm vinyl groups) |
| $a^2$ | vinyl end-stopped, vinyl-on-chain polydimethylsiloxane gum (nominal penetration = 600–1200; 140–440 ppm vinyl groups) |
| $e^1$ | silanol-stopped polydimethylsiloxane (viscosity = 25–40 cps) |

TABLE 2-continued

Components for Elastomers of Example 1.

| Component | Description |
|---|---|
| $e^2$ | methyoxy-stopped polydimethylsiloxane (viscosity = 5–11 cps) |

Like viscosity, penetration is another way of classifying elastomeric materials. Penetration is measured using Universal Penetrometer by Precision Scientific (Model No. 73510) with a substantially air free sample. The sample penetration is measured at 25° C.±1° C. using a 100 g weight and a ¼ inch diameter by ³⁄₁₆ inch needle foot with rounded edges. The needle is lowered until it just touches the surface of the polymer. Then, the time to achieve up to 300 mm penetration or the amount of penetration after 60 seconds is determined. Penetration of the gum is defined as:

$$\frac{\text{Depth of Penetration}}{\text{Time}} \times 60 \text{ sec. at } °C.$$

Penetration may be controlled by controlling the molecular weight and the volatile content of the gum.

Baseline physical properties were measured for each of samples 1–8, and are shown in Table 3. The changes in physical properties for each sample following accelerated heat aging at 232° C. (450° F.) for 70 hours were measured and are shown in Table 4 as percent change from the baseline measurement (%Δ).

TABLE 3

Basline Properties of Silicone Elastomers of Example 1

| Sample No. | Shore A | Tensile Strength | % Elongation | Tear Strength | Modulus | Specific Gravity |
|---|---|---|---|---|---|---|
| 1* | 69 | 1214 | 444 | — | 287 | 1.216 |
| 2 | 74 | 1405 | 340 | — | 436 | 1.218 |
| 3 | 73 | 1374 | 342 | — | 424 | 1.218 |
| 4 | 73 | 1438 | 323 | 122 | 420 | 1.223 |
| 5 | 72 | 1565 | 342 | 118 | 462 | 1.221 |
| 6* | 28 | 1068 | 913 | 78 | 74 | 1.109 |
| 7 | 32 | 1149 | 838 | 80 | 75 | 1.105 |
| 8 | 32 | 1360 | 855 | 95 | 84 | 1.106 |

—Not measured
*Comparative samples

TABLE 4

Heat Age Properties of Silicone Elastomers of Example 1

| Sample No. | Ammonium formate | Shore A, % Δ | Tensile Strength, % Δ | Elongation % Δ | Modulus, % Δ |
|---|---|---|---|---|---|
| 1* | No | 32.8 | −30.8 | −85 | — |
| 2 | Yes | 15.3 | −22.3 | −61.2 | 96.8 |
| 3 | Yes | 16.9 | −25.9 | −67.0 | 107 |
| 4 | Yes | 11.0 | −42.3 | −52.4 | 50.0 |
| 5 | Yes | 9.72 | −34.4 | −45.00 | 37.2 |
| 6* | No | 85.7 | −55.5 | −82.4 | 400 |
| 7 | Yes | 9.38 | −27.6 | −27.9 | 25.0 |
| 8 | Yes | 6.25 | −45.3 | −35.6 | 23.8 |

*Comparative samples

As can be readily seen by reference to the above Tables 1–4, the desirable properties of elastomers comprising an ammonium carboxylate in the pre-elastomer composition (Samples 2–5 and 7–8) degrades less than the control samples (1 and 6) without ammonium carboxylate. The effect is general, as demonstrated by comparing Samples 2–5 and 7–8, which comprise different elastomer formulations.

EXAMPLE 2

Three silicone pre-elastomer samples (Samples 9, 10, and 11) were prepared in accordance with the procedure outlined in Example 1 having hydrophobicized filler present in an amount of 20–21% by weight of the composition. Sample 9 was a control sample formulated without ammonium formate, and Samples 10 and 11 were formulated with a final concentration of 200 ppm and 400 ppm of ammonium formate, respectively, using as a stock solution 58.8% by weight aqueous ammonium formate [143 grams per 100 mL of water]). The extruded mixture was press-cured at 177° C. (350° F.) for ten minutes, and then post-baked at 400° F. for 1 hour. Moisture generated during the condensation is removed by heating for about 3 hours at 170° C. under a nitrogen purge. Baseline physical properties and properties after heat aging are shown in Table 5 for each sample.

TABLE 5

Baseline and Heat Age Properties of Elastomers of Example 2

| Properties | Sample 9* | | Sample 10 200 ppm $HCO_2NH_4$ | Sample 11 400 ppm $HCO_2NH_4$ | |
|---|---|---|---|---|---|
| Shore A | 40.7 | | 41.5 | 40.7 | |
| Modulus, 100% (psi) | 180 | | 179 | 177 | |
| Tensile strength (psi) | 1,422 | | 1,418 | 1,536 | |
| Elongation (%) | 459 | | 437 | 480 | |
| Die B Tear (parts per in.) | 164 | | 153 | 149 | |
| Specific Gravity | 1.435 | | 1.433 | 1.431 | |
| Compression Set | | | | | |
| 22 Hours, 350° F. (%) | 11.0 | | — | 13.8 | |
| 70 Hours, 350° F. (%) | — | | — | 22.7 | |
| Heat Age, 70 hours | 400° F. | 435° F. | — | 400° F. | 435° F. |
| Shore A, Points Δ | 1.4 | 1.2 | — | 1.7 | 2.6 |
| Tensile Strength (% Δ) | −16 | −53 | — | −16 | −47 |
| Elongation (% Δ) | −21 | −43 | — | −19 | 37 |

*Control

EXAMPLE 3

Siloxane pre-elastomer compositions were prepared according to the procedure outlined in Example 1, using the general compositions outlined in Table 6 (parts by weight of the composition except where noted). Resinous components for compositions given in Table 6 are described in Table 7. The compositions contained in addition 0.09 parts tetramethyeldivinyldisilazane, and filler in an amount of 30–32% by weight. The filler comprised various mixtures of AEROSIL 200VS (fumed silica with surface area of 200 m²/gram, available from Degussa Corporation, Dublin, Ohio), AEROSIL 130VS (fumed silica with surface area of 130 m²/gram, available from Degussa Corporation, Dublin, Ohio), MMC 3000U (micronized, surface treated mica with average particle dimensions of 0.5 microns thickness×5–10 microns diameter, available from KMG Minerals, Kings Mountain, N.C.), and MIN-U-SIL 5-micron (ground quartz with average particle size of 5 microns, available from U.S. Silica, Berkeley Springs, W.Va). The compositions also contained conventional additives including 3 parts by weight pigments which were not considered in determining proportions.

Moisture generated during the condensation was removed by heating for about 3 hours at 170° C. under a nitrogen purge. Cerium octanoate (0.02 parts per 100 parts weight of siloxane gum) and 2,5-dimethyl-2,5-di-(tert-butylperoxy)-hexane) (1.5 parts of per 100 parts weight of siloxane gum) were added to the pre-elastomer composition prior to curing. The composition was press-cured at 177° C. (350° F.) for ten minutes, and then post-baked at 400° F. for 1 hour.

TABLE 6

Silicone Elastomer Compositions of Example 3

| | Sample No. | | | | |
|---|---|---|---|---|---|
| Component | 12* | 13 | 14 | 15 | 16 |
| $a^3$ | 100 | 100 | 100 | 100 | 100 |
| $b^1$ | 2.5 | 2.5 | 2.5 | 2.5 | 2.5 |
| $e^3$ | 8.0 | 8.0 | 7.5 | 8.0 | 8.5 |
| $a^4$ | 3.3 | 3.3 | 3.3 | 3.3 | 3.3 |
| parts Filler | $51.0^1$ | $51^1$ | $48^2$ | $51^1$ | $53^3$ |
| Ammonium Formate | — | 450 ppm | 600 ppm | 600 ppm | 700 ppm |

*Control
[1] AEROSIL 200VS (29.0 parts), AEROSIL 130VS (10.0 parts), MMC 3000U (10.0 parts), MIN-U-SIL 5-micron (2.0 parts)
[2] AEROSIL 200VS (28.0 parts), AEROSIL 130VS (9.0 parts), MMC 3000U (9.0 parts), MIN-U-SIL 5-micron (2.0 parts)
[3] AEROSIL 200VS (31.0 parts), AEROSIL 130VS (10.0 parts), MMC 3000U (10.0 parts), MIN-U-SIL 5-micron (2.0 parts)

TABLE 7

Components for Elastomers of Example 3.

| Component | Description |
|---|---|
| $a^3$ | vinyl end-stopped, vinyl-on-chain poly(trifluoropropyl-methylsiloxane-co-dimethylsiloxane) gum (plasticity = 1.8–2.2 mm; vinyl content = 700–800 ppm) |
| $b^1$ | vinyl end-stopped, poly(trifluoropropylmethylsiloxane-co-dimethylsiloxane) gum (viscosity = 15000–290000 cps; vinyl content = 0.001–0.12 wt. %) |
| $e^3$ | silanol-stopped trifluoropropylmethyl polyorganosiloxane fluid (viscosity = 50–280 cps; silanol content = 5.0–6.9%) |
| $a^4$ | telomeric vinyl end-stopped, vinyl-on-chain trifluoropropylmethyl polyorganosiloxane copolymer (vinyl content = 6–8 wt. %) |

Like viscosity, plasticity is another way of classifying elastomeric materials. Plasticity is measured using a Wallace Plastometer with a substantially air free sample. The sample is positioned between parallel plates under a weight and plasticity is measured as millimeters (mm) thickness of the sample. Plasticity may be controlled by controlling the molecular weight and the volatile content of the gum.

Physical properties for each sample are shown in Table 8.

TABLE 8

Baseline and Heat Age Properties of Silicone Elastomers of Example 3

| | Sample No. | | | | |
|---|---|---|---|---|---|
| Properties | 12* | 13 | 14 | 15 | 16 |
| Shore A | 75.0 | 75.6 | 66.7 | 70.9 | 71.6 |
| Modulus, 100% (psi) | 843 | 832 | 613 | 627 | 633 |

TABLE 8-continued

Baseline and Heat Age Properties of Silicone Elastomers of Example 3

| | Sample No. | | | | |
|---|---|---|---|---|---|
| Properties | 12* | 13 | 14 | 15 | 16 |
| Tensile strength (psi) | 1329 | 1233 | 1326 | 1198 | 1247 |
| Elongation (%) | 186 | 173 | 236 | 226 | 230 |
| Die B Tear parts per in.) | 111 | 101 | 96 | 105 | 98 |
| Specific Gravity | 1.520 | 1.520 | 1.502 | 1.519 | 1.533 |
| Compression Set | | | | | |
| 22 Hours, 350° F. (%) | 13.1 | 13.0 | 13.9 | 12.2 | 15.5 |
| 70 Hours, 350° F. (%) | 29.2 | 30.3 | 28.6 | 28.7 | 36.1 |
| Heat Age, 70 hours | | | | | |
| Shore A Δ (points) | −2.7 | −0.6 | −2.5 | 1.2 | 0.3 |
| Tensile Strength (% Δ) | −77 | −70 | −80 | −75 | −76 |
| Elongation (% Δ) | −83 | −73 | −73 | −78 | −78 |

*Control

As shown in the above Tables 5 and 8, increased levels of ammonium formate (i.e., 600–700 ppm) are required in order to provide optimal results at 30–32% by weight filler loading. However, at higher levels of ammonium formate, resistance to compression set tends to be negatively impacted. Higher Durometer and modulus values are obtained with higher filler loading (see Sample Nos. 12, 15, and 16). The reduction in modulus of elasticity is consistent with lower compound plasticity, improved processability, and lower die swell.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A pre-elastomer composition for the manufacture of an elastomer having improved heat age properties, comprising:
   (a) a curable polyorganosiloxane composition;
   (b) a catalyst in an amount effective for promoting cure of the pre-elastomer composition;
   (c) a filler composition; and
   (d) ammonium formate present in an amount in the range from about 5 ppm to about 1 weight percent of total pre-elastomer composition.

2. The composition of claim 1, wherein the polymer composition comprises at least one polyorganosiloxane with vinyl-on-chain moieties, or vinyl end-group moieties, or both.

3. The composition of claim 2, wherein vinyl-on-chain moieties are vinylmethylsiloxy groups, and vinyl end-group moieties are dimethylvinylsiloxy groups.

4. The composition of claim 1, wherein the polyorganosiloxane composition comprises at least one member selected from the group consisting of:

(a) at least one vinyl end-stopped and vinyl-on-chain substituted polyorganosiloxane having the formula:

$$M^{vi}D_x^{vi}D_yM^{vi},$$

wherein x and y are different integers greater than zero and the sum of x and y has values whereby the viscosity of (a) is between 200,000 and 200,000,000 cps; and the alkenyl level varies from about 0.005 weight percent to about 14 weight percent based on (a);

(b) at least one vinyl end-stopped polyorganosiloxane gum having the formula:

$$M^{vi}D_zM^{vi},$$

wherein z is an integer greater than zero having a value whereby the viscosity of (b) is between 10,000 and 150,000,000 cps, and the alkenyl level varies from about 8 to about 2000 parts per million based on (b); and (c) at least one vinyl-on-chain polyorganosiloxane gum having non-reactive end groups with the formula $$MD^{vi}_qM,$$

wherein q is an integer greater than zero whereby the viscosity of (c) is between 200,000 and 200,000,000 cps; and the alkenyl level varies from about 0.01 weight per cent to about 14 weight percent based on (c); and further wherein:

$M^{vi}$ is $R^2(R^1)_2SiO_{0.5}$, wherein $R^1$ is selected from the group consisting of alkyl groups having from 1 to 8 carbons, phenyl, and trifluoropropyl, and $R^2$ is selected from the group consisting of linear or cyclic alkenyl groups having from 2 to 10 carbons;

M is $R^1_3SiO_{0.5}$, wherein $R^1$ is as previously defined;

$D^{vi}$ is $R^2R^1$ SiO, wherein $R^1$ and $R^2$ are as previously defined; and D is $(R^3)_2SiO$, wherein each $R^3$ is independently selected from the group consisting of alkyl groups having from 1 to 8 carbons, phenyl, and trifluoropropyl.

5. The composition of claim 4 comprising no more than one of components (a), (b), and (c), said component being present in an amount in a range between about 59 percent and about 76 percent by weight of the composition.

6. The composition of claim 4 comprising two or more of components (a), (b) and (c), said components being present in an amount in a range between about 59 percent and about 76 percent by weight of the composition.

7. The composition of claim 4, further comprising:

(d) an optional diluent gum having the formula:

$$MD_wM,$$

wherein w is an integer greater than zero whereby the viscosity of (d) is between 200,000 and 200,000,000 cps;

M is $R^1_3SiO_{0.5}$, wherein $R^1$ is selected from the group consisting of alkyl groups having from 1 to 8 carbons, phenyl, and trifluoropropyl; and D is $(R^3)_2SiO$, wherein each $R^3$ is independently selected from the group consisting of alkyl groups having from 1 to 8 carbons, phenyl, and trifluoropropyl.

8. The composition of claim 7, wherein component (d) comprises 0 to about 80 parts by weight of the composition.

9. The composition of claim 4, further comprising:

at least one optional lower molecular weight organopolysiloxane of the formula (e):

$$M^kD_pM^k, \qquad (e)$$

wherein p is an integer greater than zero whereby the viscosity of (e) is between about 4 and about 300 cps, wherein (e) is present in an amount of from 0 to about 30 parts by weight of the composition, and further wherein M is $R^1_3SiO_{0.5}$, wherein $R^1$ is selected from the group consisting of alkyl groups having from 1 to 8 carbons, phenyl, and trifluoropropyl;

D is $(R^3)_2SiO$, wherein each $R^3$ is independently selected from the group consisting of alkyl groups having from 1 to 8 carbons, phenyl, and trifluoropropyl; and $M^k$ is $R^4(R^1)_2SiO_{0.5}$, wherein $R^1$ is as previously defined, and $R^4$ is selected from the group consisting hydrogen, hydroxyl, or alkoxy radicals such as methoxy or ethoxy.

10. The composition of claim 1, wherein the ammonium formate is present in the range of about 100 ppm to about 1000 ppm.

11. An elastomer prepared from the composition of claim 1.

12. An elastomer prepared from the composition of claim 2.

13. An elastomer prepared from the composition of claim 4.

14. A pre-elastomer composition for the manufacture of an elastomer having improved heat age properties, comprising:

(a) a curable polyorganosiloxane composition, comprising: a vinyl end-stopped, vinyl-on-chain polydimethylsiloxane gum in an amount of about 100 parts by weight of the composition, and per 100 parts by weight of the gum, a silanol-stopped low molecular weight polydimethylsiloxane in an amount from about 1.0 to about 4.0 parts by weight, a methoxy-stopped polydimethylsiloxane in an amount from about 1.0 to about 4.0 parts by weight, and vinyltriethoxysilane in an amount from about 0.2 to about 1.4 parts by weight;

(b) a radical initiator in an amount effective for promoting cure of the pre-elastomer composition;

(c) a filler composition; and (d) ammonium formate present in an amount in the range from about 5 ppm to about 1 weight percent of the total polymer composition.

15. An elastomer prepared from the composition of claim 14.

16. A pre-elastomer composition for the manufacture of an elastomer having improved heat age properties, comprising:

(a) a curable polyorganosiloxane composition, comprising: a vinyl end-stopped, vinyl-on-chain poly(trifluoropropylmethylsiloxane-co-dimethylsiloxane) gum in an amount of about 100 parts, a telomeric vinyl end-stopped, vinyl-on-chain trifluoropropylmethyl polyorganosiloxane copolymer in an amount of about 1 to about 10 parts, a vinyl end-stopped, poly(trifluoropropylmethylsiloxane-co-dimethylsiloxane) gum in an amount of about 1 to about 5 parts, and a silanol-stopped trifluoropropylmethyl polyorganosiloxane fluid in an amount from about 2 to about 16 parts;

(b) a radical initiator in an amount effective for promoting cure of the pre-elastomer composition;

(c) a filler composition; and (d) ammonium formate present in an amount in the range from about 5 ppm to about 1 weight percent of the total polymer composition.

17. An elastomer prepared from the composition of claim 16.

18. A method for improving the heat age properties of an elastomer which comprises combining a pre-elastomer composition with ammonium formate present in an amount in the range from about 5 ppm to about 1 weight percent of total pre-elastomer composition.

19. The method of claim 18 in which the pre-elastomer composition comprises:

(a) a curable polyorganosiloxane composition, comprising: a vinyl end-stopped, vinyl-on-chain polydimethylsiloxane gum in an amount of about 100 parts by weight of the composition, and per 100 parts by weight of the gum, a silanol-stopped low molecular weight polydimethylsiloxane in an amount from about 1.0 to about 4.0 parts by weight, a methoxy-stopped polydimethylsiloxane in an amount from about 1.0 to about 4.0 parts by weight, and vinyltriethoxysilane in an amount from about 0.2 to about 1.4 parts by weight;

(b) a radical initiator in an amount effective for promoting cure of the pre-elastomer composition; and (c) a filler composition.

20. The method of claim 18 in which the pre-elastomer composition comprises:

(a) a curable polyorganosiloxane composition, comprising: a vinyl end-stopped, vinyl-on-chain poly(trifluoropropylmethylsiloxane-co-dimethylsiloxane) gum in an amount of about 100 parts, a telomeric vinyl end-stopped, vinyl-on-chain trifluoropropylmethyl polyorganosiloxane copolymer in an amount of about 1 to about 10 parts, a vinyl end-stopped, poly(trifluoropropylmethylsiloxane-co-dimethylsiloxane) gum in an amount of about 1 to about 5 parts, and a silanol-stopped trifluoropropylmethyl polyorganosiloxane fluid in an amount from about 2 to about 16 parts;

(b) a radical initiator in an amount effective for promoting cure of the pre-elastomer composition;

(c) a filler composition.

* * * * *